(12) United States Patent
Ozaki et al.

(10) Patent No.: US 11,467,467 B2
(45) Date of Patent: Oct. 11, 2022

(54) OPTICAL MODULATOR

(71) Applicant: Nippon Telegraph and Telephone Corporation, Tokyo (JP)

(72) Inventors: Josuke Ozaki, Tokyo (JP); Shigeru Kanazawa, Tokyo (JP); Hiromasa Tanobe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 38 days.

(21) Appl. No.: 17/050,797

(22) PCT Filed: May 8, 2019

(86) PCT No.: PCT/JP2019/018375
§ 371 (c)(1),
(2) Date: Oct. 26, 2020

(87) PCT Pub. No.: WO2019/220971
PCT Pub. Date: Nov. 21, 2019

(65) Prior Publication Data
US 2021/0124232 A1 Apr. 29, 2021

(30) Foreign Application Priority Data
May 16, 2018 (JP) .............................. JP2018-094358

(51) Int. Cl.
*G02F 1/21* (2006.01)
*G02F 1/01* (2006.01)
*G02F 1/225* (2006.01)
(52) U.S. Cl.
CPC ............ *G02F 1/212* (2021.01); *G02F 1/0121* (2013.01); *G02F 1/2257* (2013.01)

(58) Field of Classification Search
CPC ...... G02F 1/212; G02F 1/0121; G02F 1/2257; G02F 1/025
See application file for complete search history.

(56) References Cited

U.S. PATENT DOCUMENTS 9,778,539 B2 * 10/2017 Miyazaki .............. G02F 1/2255
10,852,618 B2 * 12/2020 Tsuzuki ................ G02F 1/2255
(Continued)

FOREIGN PATENT DOCUMENTS

JP     2011209456 A    10/2011
JP      201278759 A     4/2012
(Continued)

OTHER PUBLICATIONS

Kikuchi, et al., "80-GB/s Low-Driving-Voltage InP DQPSK Modulator with an n-p-i-n Structure," IEEE Photonics Technology Letters, vol. 21, No. 12, Jun. 15, 2009, pp. 787-789.
(Continued)

*Primary Examiner* — Ellen E Kim
(74) *Attorney, Agent, or Firm* — Slater Matsil, LLP

(57) ABSTRACT

Reflection between a Mach-Zehnder modulator and a termination resistor is suppressed. An optical modulator includes a differential drive open collector driver IC, a differential drive semiconductor Mach-Zehnder modulator, and a differential terminator. The Mach-Zehnder modulator includes waveguides and a differential high-frequency line. The differential terminator includes a differential high-frequency line and termination resistors. The differential high-frequency line includes a capacity provided at least one of between signal lines and between a signal line and a ground line.

16 Claims, 6 Drawing Sheets

(56) References Cited

U.S. PATENT DOCUMENTS

| | | | |
|---|---|---|---|
| 2011/0268382 A1 | 11/2011 | Takemura et al. | |
| 2012/0087614 A1 | 4/2012 | Ishimura et al. | |
| 2014/0233962 A1* | 8/2014 | Kato | H04B 10/516 |
| | | | 398/183 |
| 2014/0241659 A1 | 8/2014 | Fukuda et al. | |
| 2015/0043865 A1* | 2/2015 | Velthaus | G02F 1/2257 |
| | | | 385/3 |
| 2016/0079958 A1* | 3/2016 | Burak | H03H 9/175 |
| | | | 333/186 |
| 2016/0246156 A1* | 8/2016 | Sugiyama | H05K 3/363 |
| 2016/0313503 A1* | 10/2016 | Takemura | H05K 1/0306 |
| 2017/0082906 A1* | 3/2017 | Sugiyama | G02F 1/225 |
| 2017/0307911 A1 | 10/2017 | Miyazaki et al. | |
| 2018/0095339 A1* | 4/2018 | Maruyama | G02F 1/2255 |
| 2019/0129273 A1 | 5/2019 | Tanaka et al. | |

FOREIGN PATENT DOCUMENTS

| | | |
|---|---|---|
| JP | 2014164243 A | 9/2014 |
| JP | 2014199302 A | 10/2014 |
| JP | 2015129906 A | 7/2015 |
| JP | 2016126054 A | 7/2016 |
| JP | 2017173365 A | 9/2017 |
| WO | 2017208526 A | 12/2017 |

OTHER PUBLICATIONS

Wolf, et al., "Electro-Optical Co-Design to Minimize Powerconsumption of a 32 GBd Optical IQ-TransmitterUsing InPMZ-Modulators," 2015 IEEE CompoundSemiconductor Integrated CircuitSymposium (CSICS), Oct. 11, 2015, 4 pages.

\* cited by examiner

OPTICAL MODULATOR

CROSS-REFERENCE TO RELATED APPLICATIONS

This application is a national phase entry of PCT Application No. PCT/JP2019/018375, filed on May 8, 2019, which claims priority to Japanese Application No. 2018-094358, filed on May 16, 2018, which applications are hereby incorporated herein by reference.

TECHNICAL FIELD

The present invention relates to an optical modulator that modulates an optical signal with an electric signal

BACKGROUND

With the recent explosive increase in the amount of data communication, optical communication systems have been required to have larger capacities, and accordingly optical components used therein have been developed to achieve integration, complication, and higher speed. Examples of such optical components include optical modulators. For the purpose of an increase in transmission capacity, an optical I/Q modulator (for example, see Non-Patent Literature 1) has been recently used which is based on a Mach-Zehnder (MZ) modulator that supports multilevel modulation, such as quadrature phase shift keying (QPSK) or quadrature amplitude modulation (16 QAM).

As shown in FIG. 14, the optical I/Q modulator normally includes an optical demultiplexer 100, an I-side MZ modulator 101, a Q-side MZ modulator 102, an optical multiplexer 103, a driver IC 104 prepared for driving the I-side MZ modulator 101, a driver IC 105 prepared for driving the Q-side MZ modulator 102, an input high-frequency line 106 that transmits an I-side high-frequency electric signal generated by the driver IC 104, an input high-frequency line 107 that transmits a Q-side high-frequency electric signal generated by the driver IC 105, an optical modulation high-frequency line 108 formed in an optical modulation area of the I-side MZ modulator 101, an optical modulation high-frequency line 109 formed in an optical modulation area of the Q-side MZ modulator 102, an output high-frequency line no that transmits the I-side high-frequency electric signal that has passed through the optical modulation area of the I-side MZ modulator 101, an output high-frequency line 111 that transmits the Q-side high-frequency electric signal that has passed through the optical modulation area of the Q-side MZ modulator 102, a termination resistor 112 connected to a termination of the output high-frequency line 110, and a termination resistor 113 connected to a termination of the output high-frequency line 111.

In such an optical I/Q modulator, the high-frequency electric signal generated by the driver IC 104 is input to the optical modulation high-frequency line 108 formed in the optical modulation area via the input high-frequency line 106, and the high-frequency electric signal generated by the driver IC 105 is input to the optical modulation high-frequency line 109 formed in the optical modulation area via the input high-frequency line 107. Here, the I-side MZ modulator 101 uses an electro-optical effect to modulate an input light from the optical demultiplexer 100 according to the I-side high-frequency electric signal input to the optical modulation high-frequency line 108. Similarly, the Q-side MZ modulator 102 modulates an input light from the optical demultiplexer 100 according to the Q-side high-frequency electric signal input to the optical modulation high-frequency line 109.

For example, an optical modulation signal of 100 Gbit/s or more is generated, and accordingly the MZ modulators 101 and 102 in the chip each receive a high-speed electric signal having a symbol rate of several tens of Gbaud. Thus, a signal having an extremely high frequency is handled, which requires the optical modulator to have a broadband electro-optical (EO) band to generate a high-quality optical signal. A known effective method for increasing the band is the adoption of a traveling wave electrode. In designing the traveling wave electrode, it is important to achieve impedance matching with the termination resistor of the optical modulation high-frequency line and rate matching of electricity with light. When impedance mismatch occurs between the termination resistor and the high-frequency line of the optical modulator, the reflected wave returns to the optical modulation area, causing the high-frequency characteristic to deteriorate due to the influence of the reflected wave.

Furthermore, as a method for connecting a driver IC and an optical modulator, an open drain or open collector configuration has been recently proposed (see Non-Patent Literature 2). This configuration allows an optical modulator having any impedance to effectively receive a high-frequency electric signal and also achieves low power consumption.

However, since an impedance viewed from the side of the modulator toward the driver IC, or an output impedance, appears to be infinite, when a reflection point caused by impedance mismatch is after the input high-frequency line, multiple reflection occurs between the driver IC and the reflection point, and in some cases the high-frequency characteristic and the waveform may deteriorate. Accordingly, when an open collector driver IC or an open drain driver IC is connected to an optical modulator, it is a problem how the impedance mismatch between the high-frequency line of the optical modulator and the terminator is suppressed, as well as how the impedance matching on the high-frequency line of the optical modulator is achieved.

As above, the conventional optical modulator has a problem as follows: When an open collector (or drain) driver IC is connected to a semiconductor Mach-Zehnder modulator to which a termination resistor is wire-connected, the influence of the inductance component of the wire that connects the semiconductor Mach-Zehnder modulator and the termination resistor causes impedance mismatch and a discontinuous electric field distribution, generating a reflected wave that resonates between the driver IC and the termination resistor and thereby deteriorates the high-frequency characteristic.

CITATION LIST

Non-Patent Literature

Non-Patent Literature 1: Nobuhiro Kikuchi et al., "80-Gb/s Low-Driving-Voltage InP DQPSK Modulator With an n-p-i-n Structure," IEEE PHOTONICS TECHNOLOGY LETTERS, VOL. 21, NO. 12, Jun. 15, 2009;

Non-Patent Literature 2: N. Wolf et al., "Electro-Optical Co-Design to Minimize Power Consumption of a 32 GBd Optical IQ-Transmitter Using InP MZ-Modulators," 37th IEEE COMPOUND SEMICONDUCTOR IC (CSIC) SYMPOSIUM, 2015.

SUMMARY

Technical Problem

Embodiments of the present invention have been made to solve the above problem, and an object thereof is to provide an optical modulator that is capable of suppressing reflection between a Mach-Zehnder modulator and a termination resistor.

Means for Solving the Problem

An optical modulator according to embodiments of the present invention includes a driver IC configured to generate a differential high-frequency electric signal for optical modulation, a differential drive Mach-Zehnder modulator configured to modulate an input light according to the differential high-frequency electric signal input to a first differential high-frequency line, and a differential terminator connected to a termination of the first differential high-frequency line via a wire, wherein the driver IC is a differential drive open collector driver IC or a differential drive open drain driver IC; the differential drive Mach-Zehnder modulator includes a waveguide configured to guide the input light, and the first differential high-frequency line having an input end configured to receive the differential high-frequency electric signal from the driver IC to apply the differential high-frequency electric signal to the waveguide; the differential terminator includes a second differential high-frequency line connected to the first differential high-frequency line via a wire, and a termination resistor connected to a signal line of the second differential high-frequency line; each of the first differential high-frequency line and the second differential high-frequency line at least includes first and second signal lines disposed side by side, and first and second ground lines disposed on respective sides of the first and second signal lines; and at least one of the first differential high-frequency line and the second differential high-frequency line includes a capacity provided at least one of between the first and second signal lines and between the first and second signal lines and the respective first and second ground lines.

Furthermore, in a configuration example of the optical modulator according to embodiments of the present invention, the capacity provided between the first and second signal lines includes a meander structure for capacitively coupling the first and second signal lines while keeping a constant distance, and the capacity provided between the first and second signal lines and the respective first and second ground lines includes a meander structure for capacitively coupling the first signal line and the first ground line adjacent to the first signal line while keeping a constant distance, and a meander structure for capacitively coupling the second signal line and the second ground line adjacent to the second signal line while keeping a constant distance.

Furthermore, in a configuration example of the optical modulator according to embodiments of the present invention, the capacity provided between the first and second signal lines and the respective first and second ground lines includes a dielectric layer structure for capacitively coupling, via a lower dielectric layer, the first signal line and the first ground line adjacent to the first signal line; and a dielectric layer structure for capacitively coupling, via a lower dielectric layer, the second signal line and the second ground line adjacent to the second signal line.

Furthermore, in a configuration example of the optical modulator according to embodiments of the present invention, the capacity provided between the first and second signal lines includes a dielectric layer structure for capacitively coupling, via a dielectric layer, the first signal line and the second signal line that are disposed in different layers, and the capacity provided between the first and second signal lines and the respective first and second ground lines includes a dielectric layer structure for capacitively coupling, via a dielectric layer, the first signal line and the first ground line that are disposed in different layers; and a dielectric layer structure for capacitively coupling, via a dielectric layer, the second signal line and the second ground line that are disposed in different layers.

Furthermore, in a configuration example of the optical modulator according to embodiments of the present invention, a resistance value of the termination resistor is a value within ±10% of a design value, and a difference between differential impedances of the differential drive Mach-Zehnder modulator and the differential terminator is within ±20%.

Furthermore, in a configuration example of the optical modulator according to embodiments of the present invention, when an inductance of the wire is L, and a differential impedance of each of the differential drive Mach-Zehnder modulator and the differential terminator is Zdiff, the capacity is a value within $L/(Zdiff^2)\pm50\%$.

Furthermore, in a configuration example of the optical modulator according to embodiments of the present invention, a pitch between the first signal line of the second differential high-frequency line and the first ground line adjacent to the first signal line and a pitch between the second signal line of the second differential high-frequency line and the second ground line adjacent to the second signal line are both constant.

Furthermore, in a configuration example of the optical modulator according to embodiments of the present invention, the termination resistor of the differential terminator has one end connected to the first and second signal lines of the second differential high-frequency line, and the other end to which a drive voltage of the driver IC is applied; and the second differential high-frequency line and the termination resistor in the differential terminator are formed on a substrate made of aluminum nitride.

Effects of the Invention

Embodiments of the present invention can achieve the differential terminator that is capable of mode coupling while maintaining an electromagnetic field distribution of the high-frequency line of the differential drive Mach-Zehnder modulator. Furthermore, in at least one of the first differential high-frequency line and the second differential high-frequency line, a capacity is provided at least one of between the first and second signal lines and between the first and second signal lines and the respective first and second ground lines, which suppresses the influence of an inductance component of the wire that connects the differential Mach-Zehnder modulator and the differential terminator. Therefore, a reflected wave is suppressed, solving characteristic deterioration of the optical modulator caused by the reflected wave.

DETAILED DESCRIPTION OF ILLUSTRATIVE EMBODIMENTS

Figure 1:
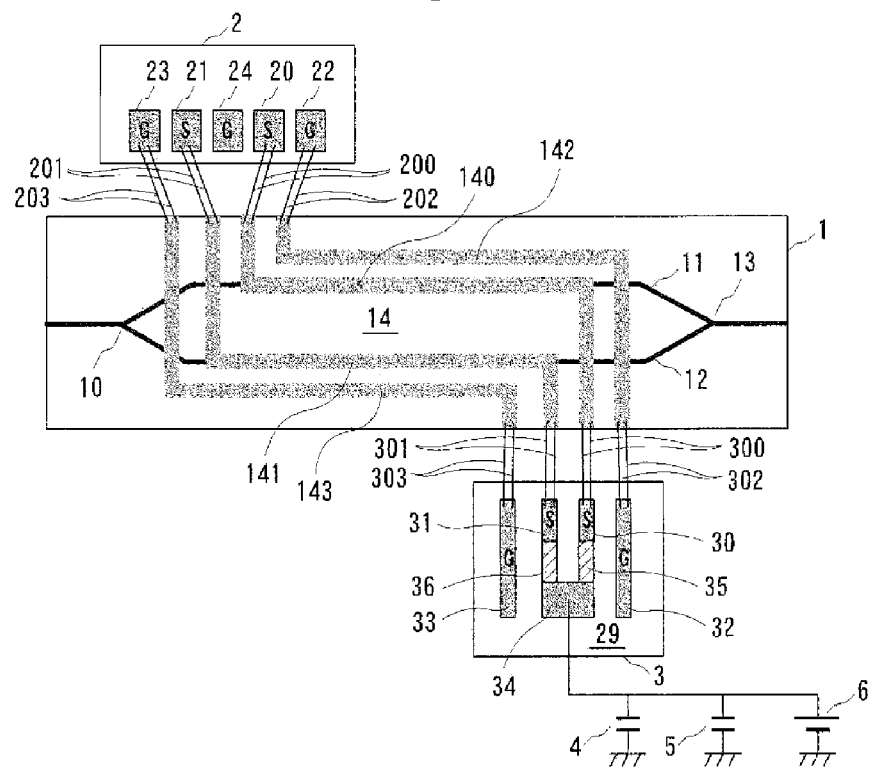
FIG. 1 is a block diagram showing a configuration of an optical modulator according to an embodiment of the present invention.

Hereinafter, an embodiment of the present invention will be explained with reference to the drawings. FIG. 1 is a block diagram showing a configuration of an optical modulator according to the embodiment of the present invention. The optical modulator of the present embodiment includes a differential drive semiconductor MZ modulator 1 having a differential impedance of 100Ω and a common-mode impedance of 25Ω, a differential drive open collector driver IC 2 that generates a differential high-frequency electric signal for optical modulation, a differential terminator 3 having a differential impedance of 100Ω and a common-mode impedance of 25Ω, and capacitors 4 and 5 each provided between a power line for a drive voltage of the differential drive open collector driver IC 2 and the ground.

The differential drive semiconductor MZ modulator 1 includes a demultiplexer 10 that separates an input light into two, two semiconductor waveguides 11 and 12 that each guide the separated input light, an optical multiplexer 13 that combines output light from the semiconductor waveguide 11 and output light from the semiconductor waveguide 12 and output the resultant light, and a differential high-frequency line 14 that applies the differential high-frequency electric signal from the differential drive open collector driver IC 2 to the two semiconductor waveguides 11 and 12.

The differential high-frequency line 14 includes a signal line (S) 140 that is a conductor disposed along the semiconductor waveguide 11, a signal line (S) 141 that is a conductor disposed along the semiconductor waveguide 12, and ground lines (G) 142 and 143 that are conductors disposed on respective sides of the signal lines 140 and 141. In this way, the differential high-frequency line 14 forms lines in a GSSG configuration.

The demultiplexer 10, the semiconductor waveguides 11 and 12, the optical multiplexer 13, and the differential high-frequency line 14 are formed on a semiconductor substrate. A structure for a waveguide and a line and an electrode structure for applying a high-frequency electric signal to the waveguide are disclosed in, for example, International Publication No. WO 2016/194369.

Figure 2:
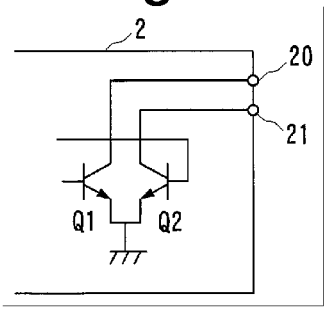
FIG. 2 is a circuit diagram showing a configuration of an output stage of a differential drive open collector driver IC according to the embodiment of the present invention.

The differential drive open collector driver IC 2 amplifies an input high-frequency electric signal for optical modulation and generates the differential high-frequency electric signal. As shown in FIG. 2, collectors of transistors Q1 and Q2 in a differential configuration on an output stage of the driver IC 2 are respectively connected to signal pads 20 and 21. Reference numerals 22 to 24 of FIG. 1 denote ground pads of the driver IC 2.

The signal pad 20 for outputting a positive-phase side high-frequency electric signal of the driver IC 2 is connected to an input end of the signal line 140 on the positive-phase side via two wires 200 having 25 μm or less. Similarly, the signal pad 21 for outputting a negative-phase side high-frequency electric signal of the driver IC 2 is connected to an input end of the signal line 141 on the negative-phase side via two wires 201 having φ25 μm or less. The ground pad 22 of the driver IC 2 is connected to an input end of the ground line 142 via two wires 202 having φ25 μm or less. Similarly, the ground pad 23 of the driver IC 2 is connected to an input end of the ground line 143 via two wires 203 having φ25 μm or less.

The differential terminator 3 includes two signal lines (S) 30 and 31 that are conductors, ground lines (G) 32 and 33 that are conductors disposed on respective sides of the two signal lines 30 and 31, a signal line 34 that is a conductor for supplying a voltage to the differential drive open collector driver IC 2, a termination resistor 35 inserted between the signal line 30 and the signal line 34, and a termination resistor 36 inserted between the signal line 31 and the signal line 34. In this way, the differential terminator 3 has a differential high-frequency line 29 in a GSSG configuration including the signal lines 30 and 31 and the ground lines 32 and 33.

A termination of the signal line 140 on the positive-phase side is connected to the signal line 30 on the positive-phase side of the differential terminator 3 via two wires 300 having φ25 μm or less. Similarly, a termination of the signal line 141 on the negative-phase side is connected to the signal line 31 on the negative-phase side of the differential terminator 3 via two wires 301 having φ25 μm or less. A termination of the ground line 142 is connected to the ground line 32 of the differential terminator 3 via two wires 302 having φ25 μm or less. A termination of the ground line 143 is connected to the ground line 33 of the differential terminator 3 via two wires 303 having φ25 μm or less.

A drive voltage for operating the differential drive open collector driver IC 2 is applied to a collector of a transistor (not shown) in a differential configuration on the output stage of the differential drive open collector driver IC 2 via the signal line 34 of the differential terminator 3, the termination resistors 35 and 36, the signal lines 30 and 31, the wires 300 and 301, the signal lines 140 and 141, the wires 200 and 201, and the pads 20 and 21. The signal line 34 is connected to a DC power 6 that generates the drive voltage.

As in FIG. 1, the capacitors 4 and 5 having a desired capacity are desirably connected to the power line to suppress a noise of the drive voltage. Although the capacities of the capacitors 4 and 5 are desirably set to, for example, 100 pF and 0.1 μF for broadband use, only one of the capacitors 4 and 5 may be provided. The optical modulator of the present embodiment operates without the capacitors 4 and 5.

By the configuration as above, the differential drive semiconductor MZ modulator 1 uses an electro-optical effect to modulate the input light input to the semiconductor waveguide 11 and the input light input to the semiconductor waveguide 12 according to the differential high-frequency electric signals input to the signal lines 140 and 141.

The optical modulator of the present embodiment is premised on a high-speed operation of 64 GBd or more, and in that case, it is not sufficient to merely regard the differential terminator 3 as a resistor in a lumped constant manner. Accordingly, the differential terminator 3 needs to be considered not only as a mere resistor but also as a high-frequency component.

In the present embodiment, the high-frequency line on the differential terminator 3 forms the differential high-frequency line 29 in a GSSG configuration including the same line width and pitch as those of the differential high-frequency line 14 so as to perform mode coupling while maintaining an electromagnetic field distribution of the differential high-frequency line 14 of the differential drive semiconductor MZ modulator 1. That is, line widths of the signal lines 30 and 31 are respectively equal to those of the signal lines 140 and 141. Furthermore, line widths of the ground lines 32 and 33 are respectively equal to those of the ground lines 142 and 143.

Furthermore, a pitch between the signal lines 30 and 31 is equal to that between the signal lines 140 and 141. A pitch between the signal line 30 and the ground line 32 is equal to that between the signal line 140 and the ground line 142, and a pitch between the signal line 31 and the ground line 33 is equal to that between the signal line 141 and the ground line 143.

Furthermore, to achieve smooth propagation of the common mode, in the differential terminator 3, the pitch between the signal line 30 and the ground line 32 and a pitch between the signal line 34 and the ground line 32 are constant, and similarly, the pitch between the signal line 31 and the ground line 33 and a pitch between the signal line 34 and the ground line 33 are constant.

Although the example of FIG. 1 is premised on a differential impedance of 100Ω and a common-mode impedance of 25Ω that are typically used, the impedance may be, for example, a differential impedance of 75Ω or a differential impedance of 50Ω in terms of the characteristics of the differential drive open collector driver IC 2. On the other hand, when the common-mode impedance is not ¼ of the differential impedance, an additional resistor is required to completely terminate the common-mode impedance.

Figure 3:
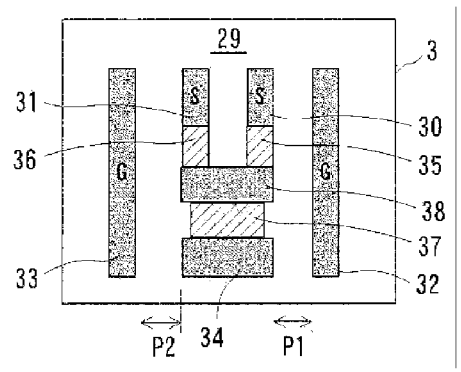
FIG. 3 is a plan view showing another example of a differential terminator of the optical modulator according to the embodiment of the present invention.

FIG. 3 shows a configuration of the differential terminator 3 including an additional termination resistor 37 for common-mode termination. In this case, one ends of the termination resistors 35 and 36 are respectively connected to the signal lines 30 and 31, and the other ends thereof are connected to a common signal line 38. One end of the termination resistor 37 is connected to the signal line 38, and the other end thereof is connected to the signal line 34. The configuration of the differential terminator 3 as in FIG. 3 allows the common-mode impedance of the differential drive semiconductor MZ modulator 1 to achieve sufficient termination even when not ¼ of the differential impedance.

In FIG. 3, in terms of the propagation characteristic in the case of the high-frequency line, the pitch between the signal line 30 and the ground line 32, a pitch between the signal line 38 and the ground line 32, and the pitch between the signal line 34 and the ground line 32 are constant values P1, and similarly, the pitch between the signal line 31 and the ground line 33, a pitch between the signal line 38 and the ground line 33, and the pitch between the signal line 34 and the ground line 33 are constant values P2. Thus, the differential input reflection characteristic can be improved in the configuration of FIG. 3 as compared with a case where the pitch between the signal line and the ground line is not constant as in an example of FIG. 4.

Figure 4:
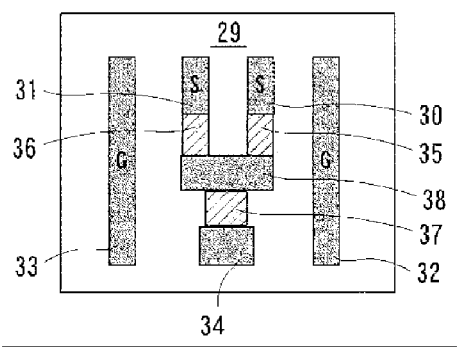
FIG. 4 is a plan view showing an example of a differential terminator with a non-constant pitch between a signal line and a ground line.
Figure 5:
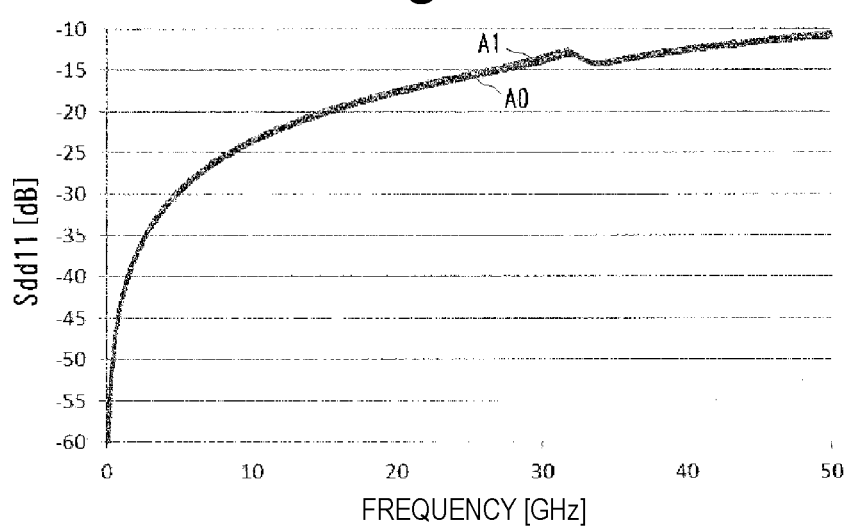
FIG. 5 is a view showing simulation results of reflection characteristics of the differential terminators in FIGS. 3 and 4.

FIG. 5 shows simulation results of reflection characteristics (Sdd11) of the differential terminators in FIGS. 3 and 4. A reference numeral A0 of FIG. 5 indicates the reflection characteristic of the differential terminator 3 in FIG. 3, and a reference numeral A1 thereof indicates the reflection characteristic of the differential terminator in FIG. 4. When the pitch between the signal line and the ground line is not constant as in the example of FIG. 4, it can be understood that the reflection characteristic deteriorates.

Figure 6:
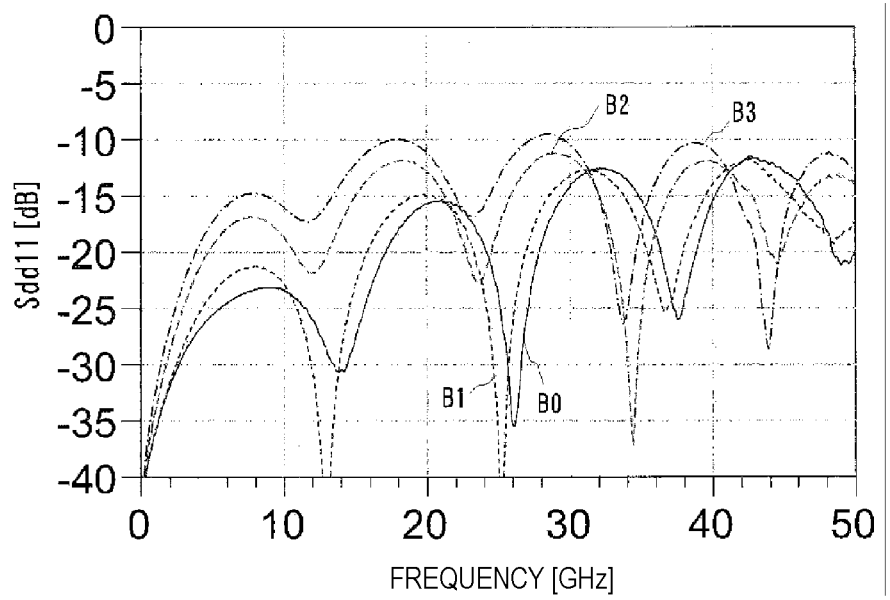
FIG. 6 is a view showing wire inductance dependency of a differential reflection characteristic between a differential drive semiconductor Mach-Zehnder modulator and the differential terminator.

Furthermore, according to FIG. 6, it can be understood that the differential reflection characteristic (Sdd11) between the differential drive semiconductor MZ modulator 1 and the differential terminator 3 deteriorates according to the magnitude of the inductance of the wires 300 to 303 (wire length) between the differential drive semiconductor MZ modulator 1 and the differential terminator 3. A reference numeral B0 of FIG. 6 indicates a reflection characteristic when an inductance L of the wires 300 to 303 is 0 pH, a reference numeral B1 thereof indicates a reflection characteristic when the inductance L is 50 pH, a reference numeral B2 thereof indicates a reflection characteristic when the inductance L is 100 pH, and a reference numeral B3 thereof indicates a reflection characteristic when the inductance L is 150 pH.

In the present embodiment, a wire bonding pad portion of the differential terminator 3 (between the signal line and the signal line or between the signal line and the ground line) is allowed to have a capacity in the range of a capacity value C determined by Formula (1) in consideration of variations as well, achieving sufficient suppression of the reflection regardless of the lengths of the wires 300 to 303.

$$C = L/(Z\text{diff}^2) \pm 50\% \ [F] \tag{1}$$

The value L of Formula (1) denotes the inductance of the wires 300 to 303, and the value Zdiff thereof denotes a design value of the differential impedance of the differential high-frequency line 29 of the differential terminator 3. To provide such a capacity of the capacity value C, the wire bonding pad portion may use a meander structure as shown in FIG. 7, 8, or 9.

Figure 7:
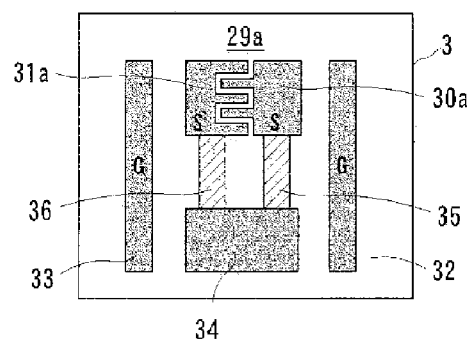
FIG. 7 is a plan view showing another example of the differential terminator of the optical modulator according to the embodiment of the present invention.

In an example of FIG. 7, a differential high-frequency line 29a includes signal lines 30a and 31a and the ground lines 32 and 33. The differential terminator 3 in the example of FIG. 7 has a meander structure for allowing the signal lines 30a and 31a to have increased lengths of face-to-face portions while keeping a constant distance, capacitively coupling the signal lines 30a and 31a.

Figure 8:
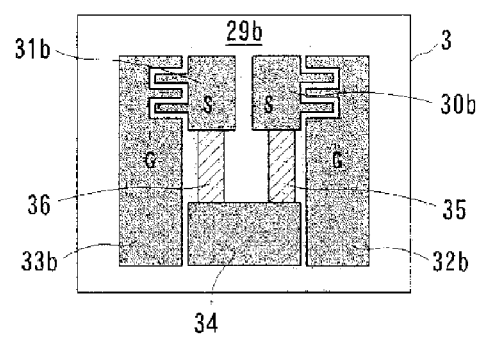
FIG. 8 is a plan view showing another example of the differential terminator of the optical modulator according to the embodiment of the present invention.

In an example of FIG. 8, a differential high-frequency line 29b includes signal lines 30b and 31b and the ground lines 32 and 33. The differential terminator 3 in the example of FIG. 8 has a meander structure for allowing the signal line 30b and a ground line 32b to have increased lengths of face-to-face portions while keeping a constant distance, and a meander structure for allowing the signal line 31b and a ground line 33b to have increased lengths of face-to-face portions while keeping a constant distance, capacitively coupling the signal line 30b and the ground line 32b and capacitively coupling the signal line 31b and the ground line 33b.

Figure 9:
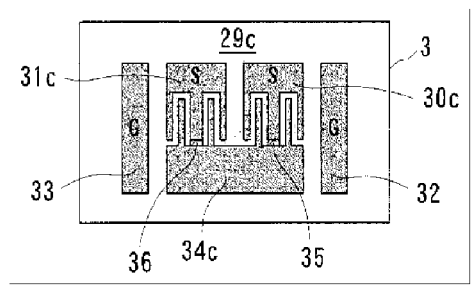
FIG. 9 is a plan view showing another example of the differential terminator of the optical modulator according to the embodiment of the present invention.

In an example of FIG. 9, a differential high-frequency line 29c includes signal lines 30c and 31c and the ground lines 32 and 33. The differential terminator 3 in the example of FIG. 9 has a meander structure for allowing the signal lines 30c and 31c and a signal line 34c to have increased lengths of face-to-face portions while keeping a constant distance, capacitively coupling the signal lines 30c and 34c and capacitively coupling the signal lines 31c and 34c.

Figure 10:
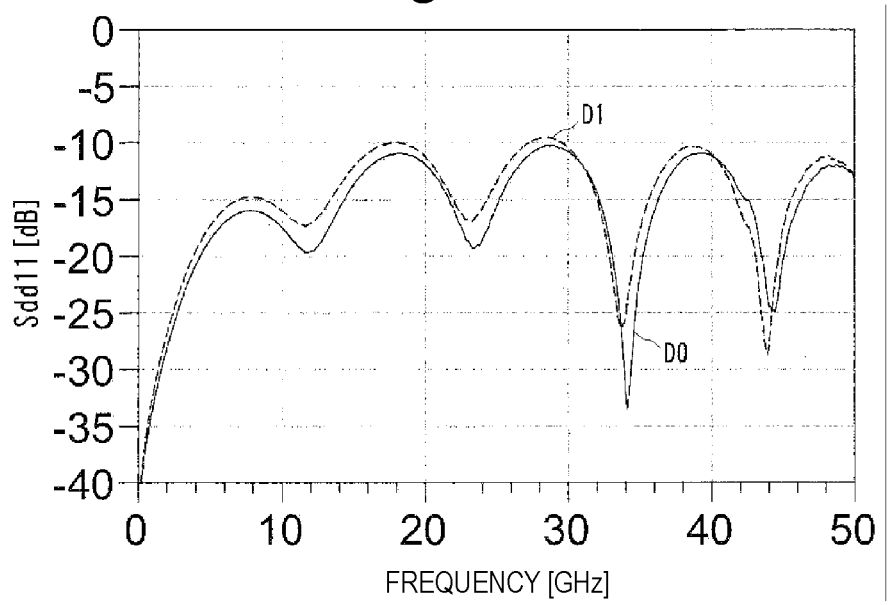
FIG. 10 is a view showing an example of a differential reflection characteristic between the differential drive semiconductor Mach-Zehnder modulator and the differential terminator according to the embodiment of the present invention.

FIG. 10 shows a differential reflection characteristic (Sdd11) between the differential drive semiconductor MZ modulator 1 and the differential terminator 3 when the configuration of FIG. 7 is used as a configuration of the differential terminator 3. Here, the inductance L of the wires 300 to 303 is set to 150 pH. A reference numeral D0 of FIG. 10 indicates a reflection characteristic when the differential terminator 3 has the configuration shown in FIG. 7, and a reference numeral D1 thereof indicates a reflection characteristic when the differential terminator 3 has the configuration shown in FIG. 1. In the configuration of FIG. 7, the capacity value C between the signal lines 30a and 31a is determined according to Formula (1).

According to FIG. 10, a capacity is provided between the signal line and the signal line or between the signal line and the ground line in the differential terminator 3. Thereby, it can be understood that the reflection between the differential drive semiconductor MZ modulator 1 and the differential terminator 3 can be suppressed regardless of the inductance of the wires 300 to 303 (length, number of wires, and the like).

In the examples of FIGS. 7 to 9, a capacity is provided on the side of the differential terminator 3. Alternatively, at a termination portion of the differential high-frequency line 14 of the differential drive semiconductor MZ modulator 1, for example, a meander structure similar to that of FIG. 7 may be used to capacitively couple the signal lines 140 and 141, or a meander structure similar to that of FIG. 8 may be used to capacitively couple the signal line 140 and the ground line 142 and to capacitively couple the signal line 141 and the ground line 143.

A design value of the differential impedance of the differential high-frequency line 14 of the differential drive semiconductor MZ modulator 1 is the same value as that of the differential impedance of each of the differential high-frequency lines 29 and 29a to 29c of the differential terminator 3. Thus, even when a capacity is provided on the side of the differential drive semiconductor MZ modulator 1, the capacity value C may be determined according to Formula (1).

Furthermore, a capacity may be provided in both of the differential terminator 3 and the differential drive semiconductor MZ modulator 1. Furthermore, a capacity may be provided both between the signal line and the signal line and between the signal line and the ground line.

Furthermore, a dielectric layer structure may be provided instead of a meander structure. That is, the signal line and the ground line are formed on a surface of a dielectric substrate (dielectric layer), and the ground line is connected to a ground conductor on a back surface of the dielectric substrate through, for example, a via hole. Thereby, the signal line and the ground line adjacent thereto can be capacitively coupled via the lower dielectric layer.

Furthermore, when a dielectric layer structure is provided between the signal line and the signal line, the signal lines disposed in different layers may be capacitively coupled via a dielectric layer provided therebetween. Furthermore, when a dielectric layer structure is provided between the signal line and the ground line, the signal line and the ground line disposed in different layers may be capacitively coupled via a dielectric layer provided therebetween.

Furthermore, as above, the differential terminator 3 functions as a relay point for supplying the drive voltage to the differential drive open collector driver IC 2 and generates heat due to a current of 50 mA or more flowing therethrough. To improve the heat dissipation in the differential terminator 3, it is desirable to use aluminum nitride (AlN) as a material of the substrate of the differential terminator 3 and, on the AlN substrate, form the signal lines 30, 30a to 30c, 31, 31a to 31c, 34, and 34c and the termination resistors 35 and 36.

Furthermore, a current of 50 mA or more flows from the differential high-frequency lime 14 of the differential drive semiconductor MZ modulator 1 to the differential drive open collector driver IC 2, and accordingly the differential high-frequency line 14 also needs to have a sufficient current allowance. When a flowing current is 50 mA or more, the signal lines 140 and 141 need to have a width of at least 50 μm or more. To achieve any impedance and rate matching with such a thick line width, the electrode structure of the differential drive semiconductor MZ modulator 1 needs to be a structure that is capable of using a wide electrode, such as a differential capacity loading structure. An electrode having such a capacity loading structure is disclosed in, for example, International Publication No. WO 2016/194369.

Figure 11:
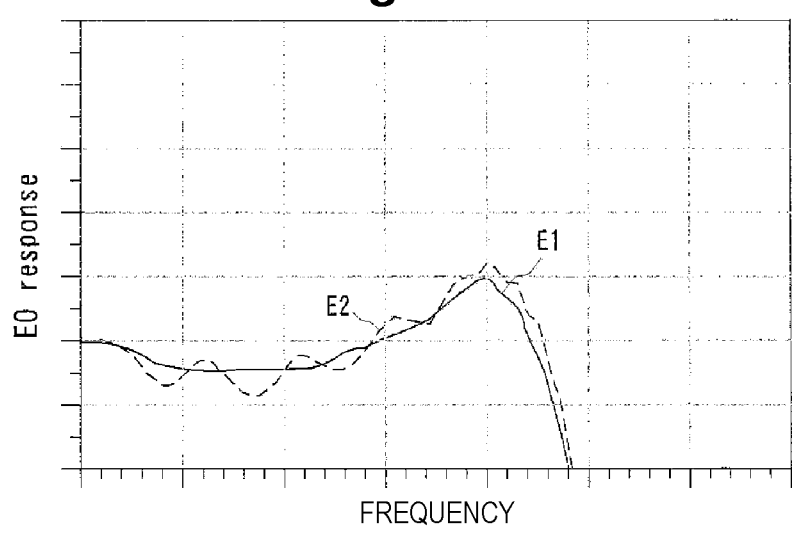
FIG. 11 is a view showing an example of an EO characteristic of the optical modulator according to the embodiment of the present invention.

In the present embodiment, using a structure as above sufficiently suppresses the reflection between the differential drive semiconductor MZ modulator 1 and the differential terminator 3, achieving an optical modulator having a smooth characteristic as shown in, for example, FIG. 11. A reference numeral E1 of FIG. 11 indicates the characteristic of the optical modulator of the present embodiment, and a reference numeral E2 thereof indicates the characteristic of a conventional optical modulator.

According to FIG. 11, it can be understood that the conventional optical modulator which is unable to achieve sufficient suppression of reflection and optimal termination has a ripple in its characteristic due to the occurrence of a reflected wave between the terminator and the driver IC. The ripple is caused because the driver IC is an open collector type, and a high-frequency signal returned to the side of the driver IC is totally reflected.

To prevent the ripple shown in FIG. 11, the differential input reflection (Sdd11) is required to be −10 dB or less in the use frequency band (a half value of the baud rate). Furthermore, the differential common-mode reflection (Scc11) is desirably −10 dB or less. Achieving such a sufficiently suppressed reflection requires to use the differential terminator 3 having a sufficient accuracy in which variations in the values of the termination resistors 35 and 36 are within ±10% of the design value. Furthermore, the difference between the differential impedances of the differential drive semiconductor MZ modulator 1 and the differential terminator 3 needs to be within ±20%.

Although in the present embodiment, the number of each of the wires 200 to 203 and 300 to 303 per signal line or ground line is two, the wires are preferred to be as short as possible to minimize the inductance caused by the wires 200 to 203 and 300 to 303, and more wires are also desirable. More specifically, a wire having a low inductance such as a wedge wire or a ribbon wire is desirably used. Only a single wedge wire or ribbon wire has a sufficiently lower inductance than a metal wire, and accordingly a plurality of wedge wires or ribbon wires needs not be used.

Furthermore, the differential drive open collector driver IC 2 of the present embodiment has pads in a GSGSG configuration in which the ground pad 23, the signal pad 21, the ground pad 24, the signal pad 20, and the ground pad 22 are arranged in this order. Furthermore, the differential drive semiconductor MZ modulator 1 has the differential high-frequency line 14 in a GSSG configuration. Accordingly, when the driver IC 2 is connected to the MZ modulator 1, the ground pad 24 at the center of the driver IC 2 is not connected via a wire and is open.

Such a configuration is an example, and the differential drive open collector driver IC 2 may have pads in a GSSG configuration. Furthermore, although the differential drive semiconductor MZ modulator 1 has the differential high-frequency line 14 in a GSSG configuration, the differential drive semiconductor MZ modulator 1 may have a GSGSG differential high-frequency line.

Furthermore, although in the optical modulator of the present embodiment, the differential drive semiconductor MZ modulator 1 is explained as an example thereof, not limited thereto, a differential drive MZ modulator including a material other than a semiconductor may be used.

Figure 14:
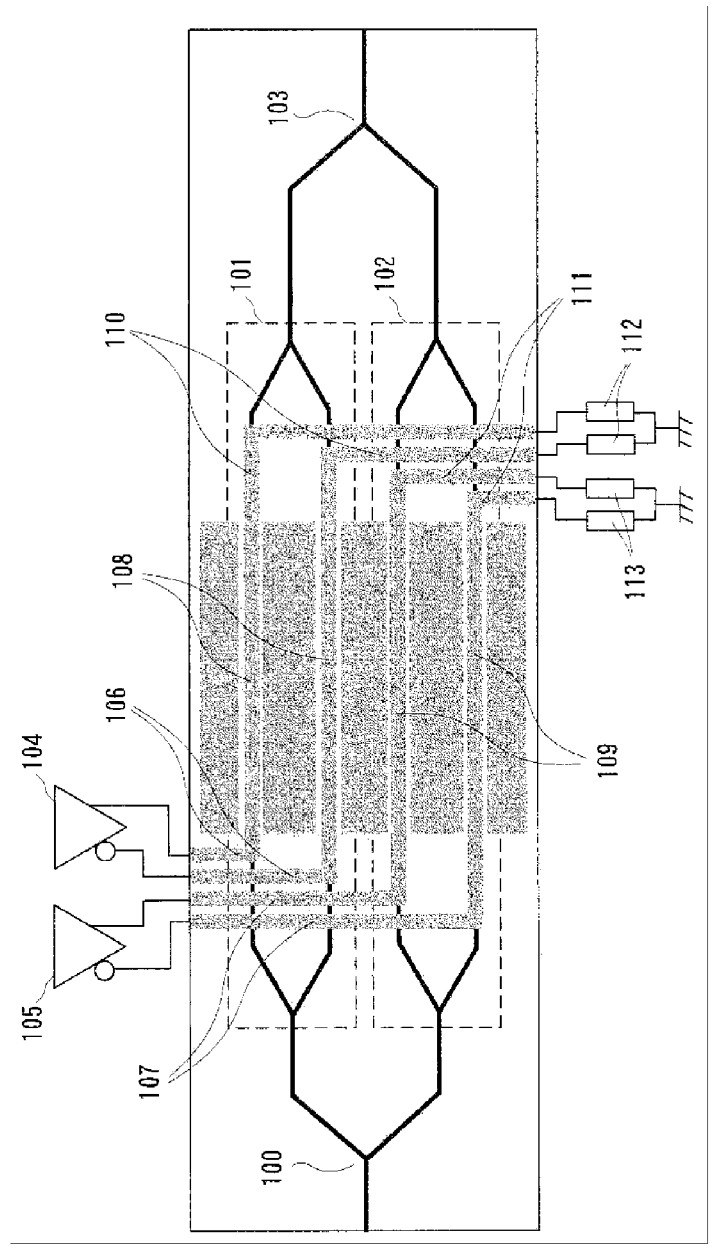
FIG. 14 is a block diagram showing a configuration of a conventional optical I/Q modulator.

Furthermore, although in the present embodiment, the example of using one differential drive MZ modulator is explained, the present invention can be applied to an IQ modulator in which two differential drive MZ modulators are integrated as in FIG. 14 and a polarization multiplexing IQ modulator in which two IQ modulators are integrated. Needless to say, in the case of the IQ modulator, two differential drive open collector driver ICs 2 and two differential terminators 3 are used, and in the case of the polarization multiplexing IQ modulator, four differential drive open collector driver ICs 2 and four differential terminators 3 are used.

Figure 12:
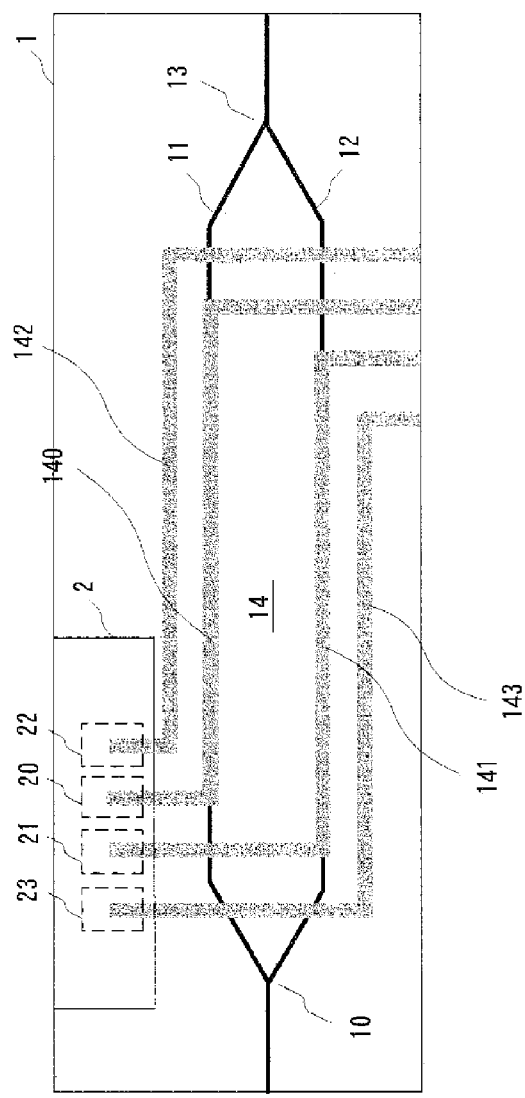
FIG. 12 is a plan view showing another configuration of the optical modulator according to the embodiment of the present invention.

Furthermore, although in the present embodiment, the differential drive open collector driver IC 2 is connected to the differential drive semiconductor MZ modulator 1 via the wires 200 to 203, the differential drive open collector driver IC 2 may be flip-chip mounted on the differential high-frequency line 14 of the differential drive semiconductor MZ modulator 1. FIG. 12 shows a plan view of the differential drive open collector driver IC 2 and the differential drive semiconductor MZ modulator 1 in this case. Pads of the differential drive open collector driver IC 2 are denoted by the same reference numerals as those of FIG. 1.

Figure 13:
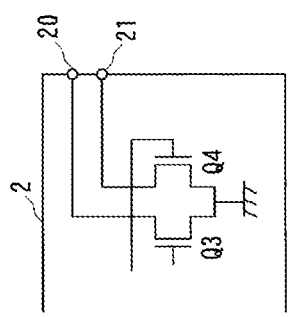
FIG. 13 is a circuit diagram showing a configuration of an output stage of a differential drive open drain driver IC according to the embodiment of the present invention.

Furthermore, instead of the differential drive open collector driver IC 2 of the present embodiment, a differential drive open drain driver IC may be used in which drains of transistors Q3 and Q4 in a differential configuration on the output stage of the driver IC are respectively connected to the signal pads 20 and 21 as shown in FIG. 13.

INDUSTRIAL APPLICABILITY

Embodiments of the present invention can be applied to an optical modulator.

REFERENCE SIGNS LIST

1 Differential drive semiconductor Mach-Zehnder modulator

2 Differential drive open collector driver IC
3 Differential terminator
4, 5 Capacitor
6 DC power
10 Demultiplexer
11, 12 Semiconductor waveguide
13 Optical multiplexer
14, 29, 29*a* to 29*c* Differential high-frequency line
20 to 24 Pad
30, 30*a* to 30*c*, 31, 31*a* to 31*c*, 34, 34*c*, 140, 141 Signal line
32, 33, 142, 143 Ground line
35, 36 Termination resistor
200 to 203, 300 to 303 Wire.

The invention claimed is:

1. An optical modulator comprising:
a driver integrated circuit (IC) configured to generate a differential high-frequency electric signal for optical modulation;
a differential drive Mach-Zehnder modulator configured to modulate an input light according to the differential high-frequency electric signal, wherein the input light is input into a first differential high-frequency line; and
a differential terminator connected to a termination of the first differential high-frequency line via a first wire;
wherein the driver IC is a differential drive open collector driver IC or a differential drive open drain driver IC;
wherein the differential drive Mach-Zehnder modulator comprises:
a waveguide configured to guide the input light; and
the first differential high-frequency line having an input end configured to receive the differential high-frequency electric signal from the driver IC to apply the differential high-frequency electric signal to the waveguide;
wherein the differential terminator comprises:
a second differential high-frequency line connected to the first differential high-frequency line via a second wire; and
a termination resistor connected to a signal line of the second differential high-frequency line;
wherein each of the first differential high-frequency line and the second differential high-frequency line comprises:
first and second signal lines disposed side by side such that no other signal or ground line is disposed between the first and second signal lines; and
first and second ground lines disposed on respective sides of the first and second signal lines, and
wherein the first differential high-frequency line or the second differential high-frequency line comprises a capacity provided between the first and second signal lines or between the first and second signal lines and the respective first and second ground lines.

2. The optical modulator according to claim 1, wherein:
the capacity provided between the first and second signal lines comprises a meander structure for capacitively coupling the first and second signal lines while keeping a constant distance; and
the capacity provided between the first and second signal lines and the respective first and second ground lines comprises:
a meander structure for capacitively coupling the first signal line and the first ground line adjacent to the first signal line while keeping a constant distance; and a meander structure for capacitively coupling the second signal line and the second ground line adjacent to the second signal line while keeping a constant distance.

3. The optical modulator according to claim 1, wherein the capacity provided between the first and second signal lines and the respective first and second ground lines comprises:
a dielectric layer structure for capacitively coupling, via a lower dielectric layer, the first signal line and the first ground line adjacent to the first signal line; and
a dielectric layer structure for capacitively coupling, via a lower dielectric layer, the second signal line and the second ground line adjacent to the second signal line.

4. The optical modulator according to claim 1, wherein:
the capacity provided between the first and second signal lines comprises a dielectric layer structure for capacitively coupling, via a dielectric layer, the first signal line and the second signal line, wherein the first signal line and the second signal line are disposed in different layers; and
the capacity provided between the first and second signal lines and the respective first and second ground lines comprises:
a dielectric layer structure for capacitively coupling, via a dielectric layer, the first signal line and the first ground line, wherein the first signal line and the first ground line are disposed in different layers; and
a dielectric layer structure for capacitively coupling, via a dielectric layer, the second signal line and the second ground line, wherein the second signal line and the second ground line are disposed in different layers.

5. The optical modulator according to claim 1, wherein:
a resistance value of the termination resistor is a value within ±10% of a design value, and
a difference between differential impedances of the differential drive Mach-Zehnder modulator and the differential terminator is within ±20%.

6. The optical modulator according to claim 1, wherein when an inductance of the first wire or the second wire is L, and a differential impedance of each of the differential drive Mach-Zehnder modulator and the differential terminator is Zdiff, the capacity is a value within $L/(Zdiff^2) \pm 50\%$.

7. The optical modulator according to claim 1, wherein a pitch between the first signal line of the second differential high-frequency line and the first ground line adjacent to the first signal line and a pitch between the second signal line of the second differential high-frequency line and the second ground line adjacent to the second signal line are both constant.

8. The optical modulator according to claim 1, wherein:
the termination resistor of the differential terminator has one end connected to the first and second signal lines of the second differential high-frequency line and the other end to which a drive voltage of the driver IC is applied, and
the second differential high-frequency line and the termination resistor in the differential terminator are disposed on an aluminum nitride substrate.

9. A method comprising:
generating, by a driver integrated circuit (IC), a differential high-frequency electric signal for optical modulation; and
modulating, by a differential drive Mach-Zehnder modulator, an input light according to the differential high-frequency electric signal, wherein the input light is input into a first differential high-frequency line;
wherein a differential terminator is connected to a termination of the first differential high-frequency line via a first wire;
wherein the driver IC is a differential drive open collector driver IC or a differential drive open drain driver IC;
wherein the differential drive Mach-Zehnder modulator comprises:
a waveguide configured to guide the input light; and
the first differential high-frequency line having an input end configured to receive the differential high-frequency electric signal from the driver IC to apply the differential high-frequency electric signal to the waveguide;
wherein the differential terminator comprises:
a second differential high-frequency line connected to the first differential high-frequency line via a second wire; and
a termination resistor connected to a signal line of the second differential high-frequency line;
wherein each of the first differential high-frequency line and the second differential high-frequency line comprises:
first and second signal lines disposed side by side such that no other signal or ground line is disposed between the first and second signal lines; and
first and second ground lines disposed on respective sides of the first and second signal lines, and
wherein the first differential high-frequency line or the second differential high-frequency line comprises a capacity provided between the first and second signal lines or between the first and second signal lines and the respective first and second ground lines.

10. The method according to claim 9, wherein:
the capacity provided between the first and second signal lines comprises a meander structure for capacitively coupling the first and second signal lines while keeping a constant distance; and
the capacity provided between the first and second signal lines and the respective first and second ground lines comprises:
a meander structure for capacitively coupling the first signal line and the first ground line adjacent to the first signal line while keeping a constant distance; and
a meander structure for capacitively coupling the second signal line and the second ground line adjacent to the second signal line while keeping a constant distance.

11. The method according to claim 9, wherein the capacity provided between the first and second signal lines and the respective first and second ground lines comprises:
a dielectric layer structure for capacitively coupling, via a lower dielectric layer, the first signal line and the first ground line adjacent to the first signal line; and
a dielectric layer structure for capacitively coupling, via a lower dielectric layer, the second signal line and the second ground line adjacent to the second signal line.

12. The method according to claim 9, wherein:
the capacity provided between the first and second signal lines comprises a dielectric layer structure for capacitively coupling, via a dielectric layer, the first signal line and the second signal line, wherein the first signal line and the second signal line are disposed in different layers; and the capacity provided between the first and second signal lines and the respective first and second ground lines comprises:
- a dielectric layer structure for capacitively coupling, via a dielectric layer, the first signal line and the first ground line, wherein the first signal line and the first ground line are disposed in different layers; and
- a dielectric layer structure for capacitively coupling, via a dielectric layer, the second signal line and the second ground line, wherein the second signal line and the second ground line are disposed in different layers.

13. The method according to claim 9, wherein:
a resistance value of the termination resistor is a value within ±10% of a design value, and
a difference between differential impedances of the differential drive Mach-Zehnder modulator and the differential terminator is within ±20%.

14. The method according to claim 9, wherein when an inductance of the first wire or the second wire is L, and a differential impedance of each of the differential drive Mach-Zehnder modulator and the differential terminator is Zdiff, the capacity is a value within $L/(Zdiff^2)\pm_50\%$.

15. The method according to claim 9, wherein a pitch between the first signal line of the second differential high-frequency line and the first ground line adjacent to the first signal line and a pitch between the second signal line of the second differential high-frequency line and the second ground line adjacent to the second signal line are both constant.

16. The method according to claim 9, wherein:
the termination resistor of the differential terminator has one end connected to the first and second signal lines of the second differential high-frequency line and the other end to which a drive voltage of the driver IC is applied; and
the second differential high-frequency line and the termination resistor in the differential terminator are disposed on a aluminum nitride substrate.

* * * * *